(12) United States Patent
Bridges

(10) Patent No.: US 7,576,836 B2
(45) Date of Patent: Aug. 18, 2009

(54) CAMERA BASED SIX DEGREE-OF-FREEDOM TARGET MEASURING AND TARGET TRACKING DEVICE

(75) Inventor: Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 11/738,005

(22) Filed: Apr. 20, 2007

(65) Prior Publication Data

US 2008/0111985 A1    May 15, 2008

Related U.S. Application Data

(60) Provisional application No. 60/793,487, filed on Apr. 20, 2006.

(51) Int. Cl.
*G01C 3/00* (2006.01)
(52) U.S. Cl. ..................................... 356/3.13
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 4,396,945 A | | 8/1983 | DiMatteo et al. |
| 4,714,339 A | * | 12/1987 | Lau et al. ................... 356/4.09 |
| 4,790,651 A | | 12/1988 | Brown et al. |
| 5,196,900 A | * | 3/1993 | Pettersen ................. 356/141.4 |
| 5,440,392 A | * | 8/1995 | Pettersen et al. ............ 356/620 |
| 5,973,788 A | * | 10/1999 | Pettersen et al. ............ 356/614 |
| 6,279,246 B1 | | 8/2001 | van den Bossche |
| 2002/0048027 A1 | | 4/2002 | Pettersen et al. |
| 2004/0136012 A1 | * | 7/2004 | Kyle et al. .................. 356/614 |

OTHER PUBLICATIONS

PCT Search Report—PCT/US2007/009593.

* cited by examiner

*Primary Examiner*—Thomas H Tarcza
*Assistant Examiner*—Luke D Ratcliffe
(74) *Attorney, Agent, or Firm*—Cantor Colburn LLP

(57) ABSTRACT

An embodiment may comprise a camera based target coordinate measuring system or apparatus for use in measuring the position of objects in manner that preserves a high level of accuracy. This high level of measurement accuracy is usually only associated with more expensive laser based devices. Many different arrangements are possible. Other embodiments may comprise related methods of using a camera based target coordinate measuring method for use in measuring the position of objects. Many variations on the methods are possible. For example, an embodiment may comprise a camera based coordinate measuring system for use in measuring the position of a target relative to at least one frame of reference without requiring use of a laser range finder for measuring distance comprising: at least three or more light sources located on a target at known three-dimensional coordinates relative to each other; at least one rotatable camera rotatable on about a first axis and a second axis wherein the camera records positions of the light sources; and two angular measuring devices to measure the angles of rotation of the camera about the first and second axes; and a processor for determining up to three positional degrees of freedom and up to three rotational degrees of freedom of the target.

18 Claims, 10 Drawing Sheets

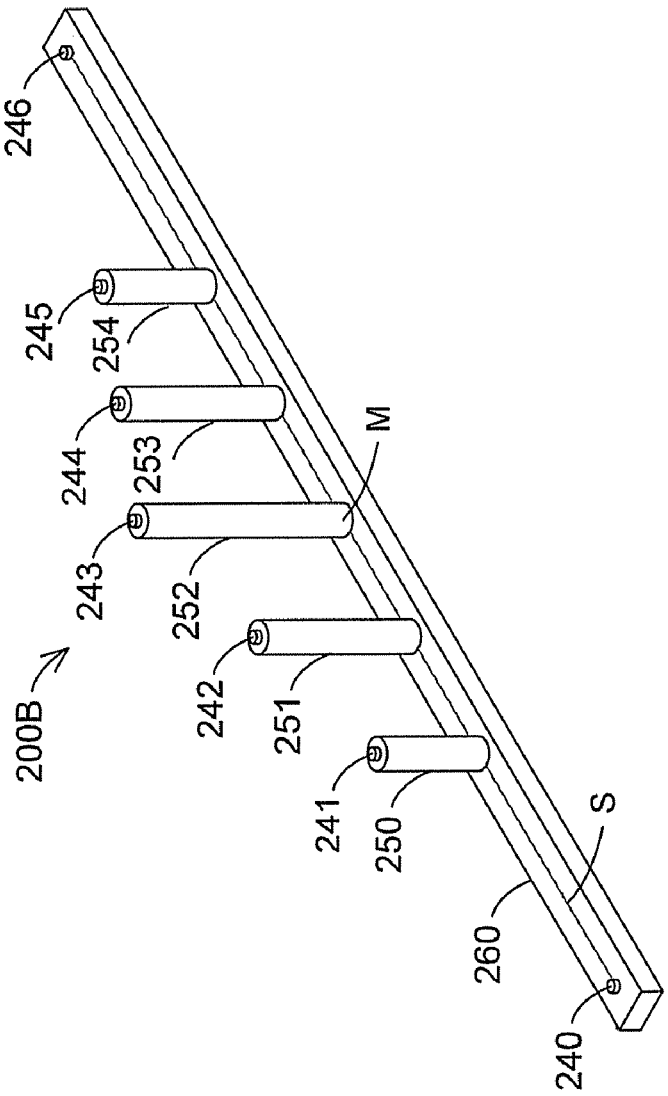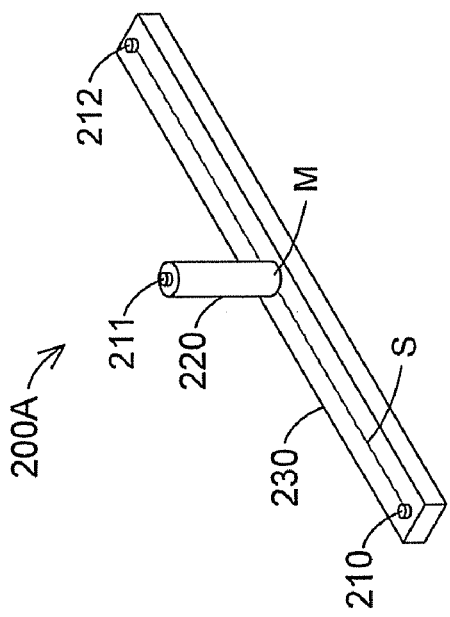
FIGURE 2

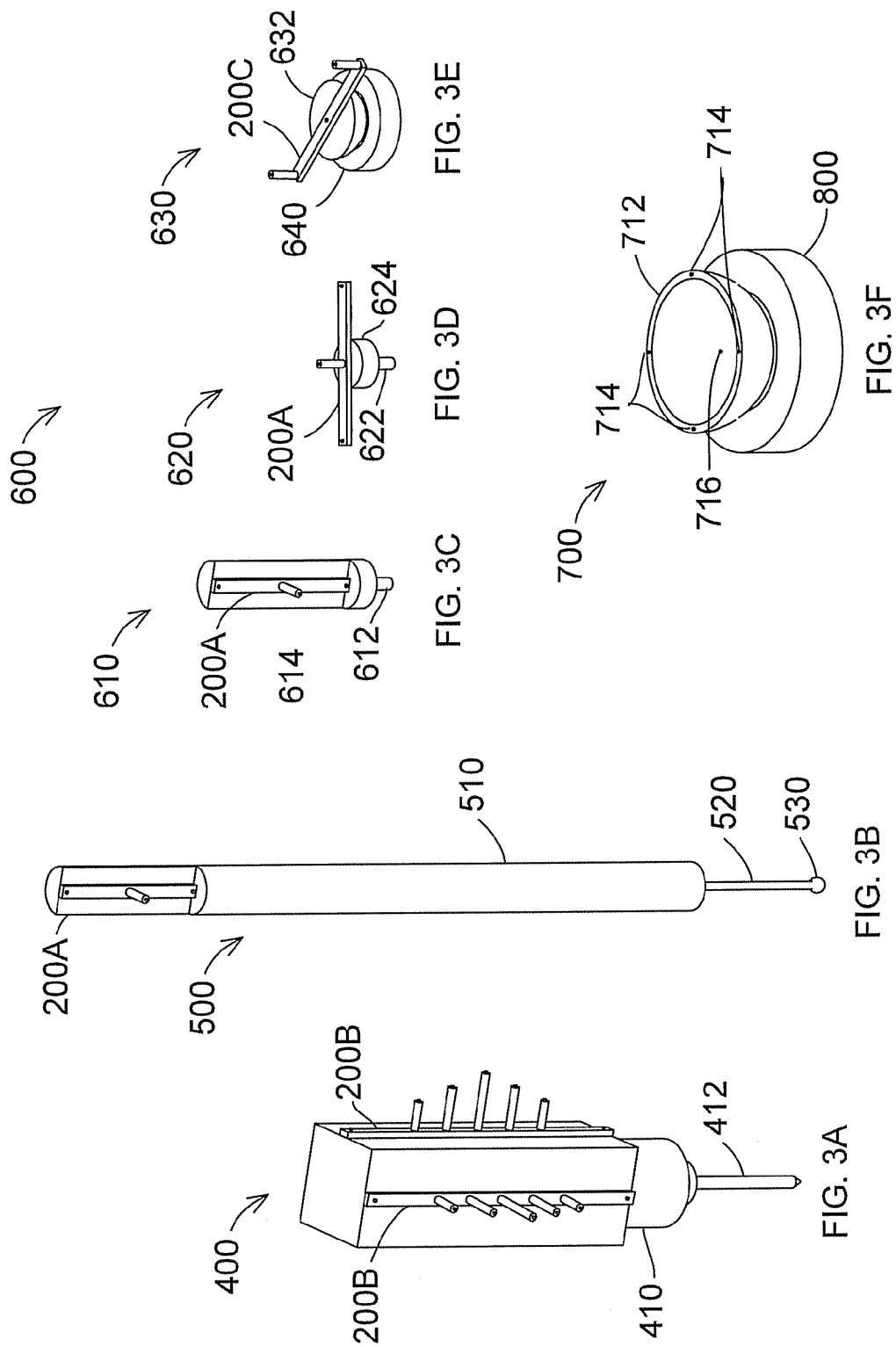

PERSPECTIVE VIEW

FRONT VIEW

CAMERA BASED SIX DEGREE-OF-FREEDOM TARGET MEASURING AND TARGET TRACKING DEVICE

CROSS REFERENCE

This application claims priority to U.S. provisional application, 60/793,487, filed Apr. 20, 2006, the entire contents of which are incorporated herein by reference.

BACKGROUND

The present disclosure relates to a coordinate measuring device. One set of coordinate measurement devices belongs to a class of instruments that measure the three-dimensional coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 to Lau et al.

The laser tracker is a particular type of coordinate-measuring device that tracks the retroreflector target with one or more laser beams it emits. A coordinate-measuring device that is closely related to the laser tracker is the laser scanner. The laser scanner steps one or more laser beams to points on a diffuse surface.

A second set of coordinate measurement devices belongs to a class of instruments that measure coordinates using one or more cameras to view points of light attached to a probe. Cameras view these points of light and from the images determine the position of the probe tip. In most cases, two or more cameras are used. These cameras may be rigidly connected, or they may be set up individually according to the particular measurement requirements. If the cameras are not rigidly connected, a reference length must be measured by the cameras either before or during the measurement to establish the scale. An exemplary system for determining the coordinates of a point using cameras and points-of-light is described by U.S. Pat. No. 5,196,900 to Pettersen.

It is also possible to find the coordinates of a probe tip by using a single camera to view points of light attached to the probe. Generally such devices are regarded as not very accurate but appropriate when low cost or ability to see into narrow openings is important. An exemplary system for determining the coordinates of a probe tip using a single camera is described by U.S. Pat. No. 5,440,392 to Pettersen, et al.

To get around the limitations in radial distance accuracy in the single-camera system, methods have been devised for combining a camera with a rangefinder. In one embodiment, a rangefinder comprises a distance meter and one or more steering mirrors. The rangefinder measures the distance to a retroreflector mounted on a probe. Simultaneously, a camera positioned near the rangefinder measures the angles to point light sources located on the probe. The combination of distance and angle information gives the coordinates of the probe tip. In a second embodiment, a rangefinder comprises a distance meter and one or more steering mirrors. The rangefinder directs light to a retroreflector mounted on a probe. Part of the laser light returning from the retroreflector travels to a distance meter and another part splits off to a camera. The camera also measures the angles to point light sources located on the probe. The combination of distance and angle information gives the coordinates of the probe tip. An exemplary system for determining the coordinates of a probe tip using a camera in conjunction with a rangefinder is described in U.S. Pat. No. 5,973,788 to Pettersen, et al.

None of these coordinate measurement devices is ideal for many of the problems in an automated factory. Laser trackers, though highly accurate and fast, are too expensive for many common operations such as precisely positioning robot end effectors to drill holes. In addition, laser trackers measure only three-dimensional coordinates rather than all six degrees of freedom. Because of this, laser trackers must in some cases measure three or more targets to find all six degrees of freedom. Measuring multiple targets in this way requires additional time and targets.

Camera-based coordinate measurement devices based on two or more cameras are also expensive and also have geometrical limitations. To be accurate, individual cameras must be spaced relatively far apart compared to the measurement range. Consequently, camera systems are limited in their ability to see into narrow openings. Camera systems also have a limited field-of-view, which means that time-consuming relocation procedures may be necessary to view all targets within the measurement volume.

Systems that contain only a single camera can be made inexpensively but are not accurate enough in measuring radial distance when a small target appropriate for robotic control or factory automation is used. Adding a rangefinder improves accuracy but is too expensive for most robotic and factory automation applications. In view of these limitations, there is a need today for a device that is low cost and accurate and that does not have the geometrical limitations of today's camera-based systems.

SUMMARY OF THE INVENTION

An embodiment may comprise a camera based target coordinate measuring system and/or apparatus for use in measuring the position of objects in manner that preserves a high level of accuracy. This high level of measurement accuracy is usually only associated with more expensive laser based devices. Many different arrangements are possible.

For example, in one embodiment, a camera based target coordinate measuring system for use in measuring the position of objects without requiring use of a laser range finder for measuring distance comprises a camera rotatable about a first axis and a second axis; a target having at least three or more light sources wherein the light sources are located on the target at known three-dimensional coordinates relative to each other and wherein at least one of the light sources is located at a different distance from the camera than the midpoint of a line segment connecting two of the other light sources, and wherein the target is structured to be placed on an object to be measured or to be placed on a device to measure the object; two angular measuring devices to measure the angles of rotation of the camera about the first and second axes; at least one motor to rotate the camera about the first and second axes; a photosensitive pixel array located in the camera for recording images of the light sources on the target; and a processor for directing the motor and for determining up to three positional degrees of freedom and up to three rotational degrees of freedom of the target.

Another embodiment may comprise a camera based coordinate measuring system for use in measuring the position of a target relative to at least one frame of reference without requiring use of a laser range finder for measuring distance comprising: at least three or more light sources located on a target at known three-dimensional coordinates relative to each other; at least one rotatable camera rotatable on about a first axis and a second axis wherein the camera records positions of the light sources; and two angular measuring devices to measure the angles of rotation of the camera about the first and second axes; and a processor for determining up to three positional degrees of freedom and up to three rotational degrees of freedom of the target.

Other embodiments may comprise related methods of using a camera based target coordinate measuring method for use in measuring the position of objects. Many variations of the methods are possible.

For example, one specific method comprises, a camera based target coordinate measuring method for use in measuring the position of objects without requiring use of a laser range finder for measuring distance comprising: operating a camera rotatable about a first axis and a second axis; placing a target to view with the camera and having at least three or more light sources wherein the light sources are located on the target at known three-dimensional coordinates relative to each other and wherein at least one of the light sources is located at a different distance from the camera than the midpoint of a line segment connecting two of the other light sources, and wherein the target is structured to be placed on an object to be measured or to be placed on a device to measure the object; measuring angles of rotation of the camera about the first and second axes with two angular measuring devices; rotating the camera about the first and second axes with at least one motor; recording the images of the light sources on a photosensitive pixel array located in the camera; and determining in a processor up to three positional degrees of freedom and up to three rotational degrees of freedom of the target.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 2A and 2B are perspective views of exemplary targets 200A and 200B; and FIGS. 3A-3F are perspective views of exemplary targets 200A and 200B and 200C and 700.

DETAILED DESCRIPTION OF THE PREFERRED EMBODIMENTS

Figure 1:
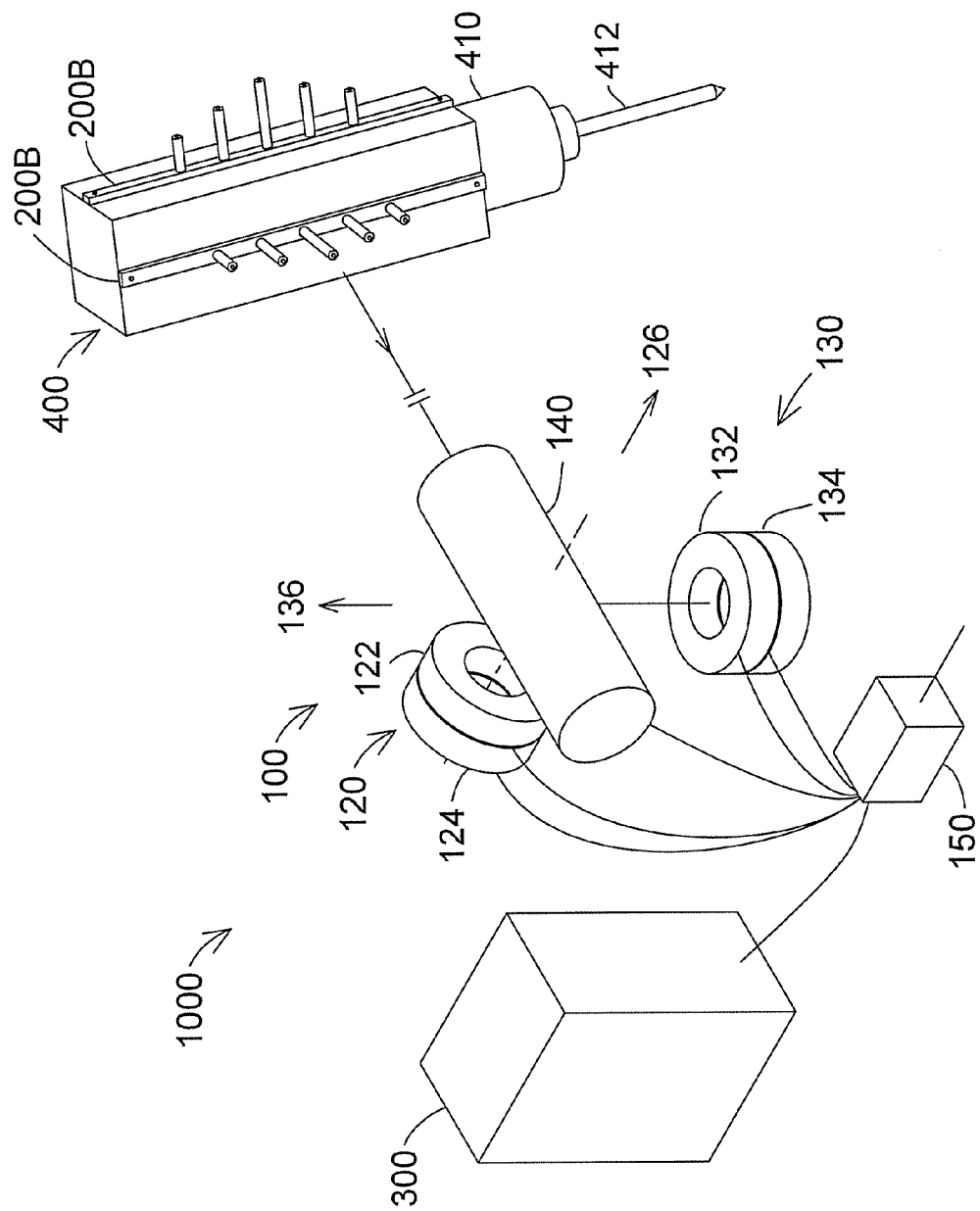
FIG. 1 is a perspective view of an exemplary three-dimensional measuring device and system.

As shown in FIG. 1, an exemplary six degree of freedom (6-DOF) tracker 1000 may comprise a rotating tracking camera 100, target 400, and computer 300. Six degrees of freedom may be the x, y, z coordinates, and the pitch, roll, and yaw of target 400 for example.

Overall tracking camera apparatus 100 may comprise first-angle assembly 120, second-angle assembly 130, camera 140, and processor 150.

First-angle assembly 120 comprises first-angle shaft (not shown) onto which are mounted angle meter 122 and motor 124. Angle meter 122 is preferably an angular encoder and motor 124 is preferably a servo-motor. First-angle shaft (not shown) rotates around first axis 126, which in this figure is the zenith axis. The first and second axes intersect at a point in space called the gimbal point.

Second-angle assembly 130 comprises second-angle shaft (not shown) onto which are mounted angle meter 132 and motor 134. Angle meter 132 is preferably an angular encoder and motor 134 is preferably a servo-motor. Second-angle shaft (not shown) rotates around second axis 136, which in this figure is the azimuth axis.

Camera 140 is mounted on first-angle assembly 120. First angle assembly and camera rotate about first axis 126. First angle assembly is mounted on second-angle assembly. Second-angle assembly 130 rotates with respect to the base about second axis 136.

The camera 140 shown in the FIG. 1 is well known. All that is necessary is that it is possible to direct the camera 140 to point at any direction within the measurement volume. Any two angular rotations can be used to obtain the desired imaging of target 200B on the camera.

Targeted end effector 400 comprises end effector 410 and one or more of target 200B in this example. End effector 400 may be mounted on a robot arm or machine tool for example. Tool 412, which may be a drill bit, mill, or any other attachment, is connected to end effector 410. Many other configurations are also contemplated herein, and FIG. 1 merely shows one of many possible configurations.

The purpose of camera 140 is to form an image of target 200B on a photosensitive array within the camera and to read out the values on this array for analysis so that the position of tool 412 can be precisely controlled. Of note, tool 412 can be controlled even when it is not visible to camera 140 so long as target 200B is visible.

Processor 150 uses image intensity values from pixels of camera 140 and angle data from angle meters 122 and 132 to calculate the six degrees of freedom of target 400. Processor 150 also sends control signals to motors 124 and 134 to move the camera into the desired position.

There are three types of position control that can be selected by the user: (1) tracking position control, (2) user-specified position control, and (3) manual position control. If tracking position control is selected, processor 150 causes the motor to be adjusted to keep target 200 approximately centered on the photosensitive array(s) within camera 140. If user-specified position control is desired, processor 150 causes motors to drive mirror to the direction selected by the user. If manual position control is desired, motors 124 and 134 are turned off, allowing the user to manually point the mirror in the desired direction.

With reference to FIG. 2, target 200 comprises at least three points of light at fixed positions relative to one another. In general, by using more than 3 points, it is possible to maintain high radial accuracy over an extended range. For example, target 200A, which is a first embodiment of target 200, comprises points of light 210, 211, and 212, pedestal 220, and base 230. Points of light are preferably LEDs but may be other types of active light sources or may also be passive reflectors. An example of a passively reflector is a photogrammetric spot that is illuminated by flashing lights located in the vicinity of 6-DOF tracker 1000.

Target 200B, which is a second embodiment of target 200, comprises seven points of light 240-246, five pedestals 250-254, and base 260. In operation, additional points of light on target 200B are turned on as target 200B moves away from 6-DOF tracker 1000 with camera 140. Thus, when the target 200B is located close to 6-DOF tracker 1000, points of light 242, 243, and 244 illuminate. Farther away, points of light 241 and 245 also illuminate. Still farther away, additional points of light 240 and 246 also illuminate Alternatively, all seven points of light may be illuminated at all times, with more points of light coming into view as distance is increased.

Ordinarily base 230 or 260 is attached to some other object whose six degrees of freedom are to be measured. Pedestals such as 220 and 250-254 provide a geometry that is favorable for high accuracy measurement of radial distance to the object. A light source is mounted onto a pedestal so that its axis of emission is approximately in line with the axis of the pedestal. Camera 140 points at a target, which may be 200B, for example, as shown in FIG. 1. The axis of camera 140 is kept more or less in line with the axes of the pedestals. A good rule of thumb is that the optical axis of camera 140 should be within ±45 degrees of the pedestal axes. As explained in the section on System Accuracy, the best accuracy is obtained when the angle is zero degrees.

A good choice for light sources 210-212 and 240-246 are LEDs that emit over a wide field of view. LEDs that emit over a full-angle of 110 to 120 degrees are readily available. The pedestals are preferably tall enough so that the higher pedestals do not clip the light emerging from the lower pedestals. Also the pedestals should be tall enough to provide sufficient accuracy. A good rule of thumb is that the pedestals should be tall enough to produce an angle of at least 20 degrees between base 230 and the line of light sources 210, 211 or between base 260 and the line of light sources 240-243. The advantage of having a large enough angle will be made clear in the section on System Accuracy.

Although targets 200A and 200B have points of light mounted on pedestals that are higher at the center and lower at the edges, it is equally possible to place the higher pedestals at the edges and the lower pedestals nearer the center. As will be made clear from the mathematical arguments that follow, as the difference in the height of the light sources increases, the accuracy of the pitch and yaw angles also increases. Thus, in at least an embodiment, a target is used having at least three or more light sources wherein the light sources are located on the target at known three-dimensional coordinates relative to each other and wherein at least one of the light sources is located at a different distance from the camera than the midpoint M of a line segment S connecting two of the other light sources, and wherein the target is structured to be placed on an object to be measured or to be placed on a device to measure the object. See FIG. 2.

Points of light 210-212 in 200A and 240-246 in 200B are coplanar and appear to form a straight line when viewed from a certain direction. This pattern was selected because its principle of operation is easy to explain. However, in general, the light sources can be arranged in a variety of patterns without sacrificing accuracy. It is not necessary that all of the points be coplanar or that they appear to form a straight line when viewed from a particular direction.

To understand the benefit of the arrangement of light sources in target 200B, consider the following. In general, the spots of light on the photosensitive array within camera 140 will not fill the array. In other words, the spots of light will not extend from the far left side of the array to the far right, nor will they extend from the lower edge to the upper edge. Instead, some smaller fraction of the array is usually covered. Another way of saying this is that only a fraction of the available range of pixels along a given direction in the array is subtended by the spots of light in the image. As explained in the section on System Accuracy, the relative uncertainty in radial distance measurement of 6-DOF tracker 1000 is proportional to the fraction of the photosensitive array in the camera subtended by the points of light from the target 200B for example. As target 200B moves away from 6-DOF tracker 1000, the fraction of the array subtended by points of light decreases, causing the relative accuracy to decrease proportionately. By turning on additional points of light as target 200B moves away from 6-DOF tracker 1000, the relative accuracy is restored. The light sources in target 200B are spaced such that size of the target visible to camera 140 increases by a factor of 2 each time two new spots of light appear in the camera image.

As a specific example, suppose that LEDs 242, 243, and 244 nearly fill the photosensitive array when target 200B is 1 meter from 6-DOF tracker 1000. As target 200B moves to nearly 2 meters away, the accuracy drops—for example, from 5 to 10 ppm, as explained in the section on accuracy below. As the target moves to greater than 2 meters away, points of light 241 and 245 also turn on. This restores the accuracy to 5 ppm. As the target moves to beyond 4 meters away, points of light 240 and 246 also turn on. In this way, it is possible to maintain a relative accuracy in the radial distance measurement of 5 to 10 ppm over the range of 1 to 8 meters.

In reference to FIG. 3, other embodiments of target 200 are shown. For example, targeted end effector 400 comprises end effector 410 and one or more of embodiment target 200B. (Target 200A could equally well have been used.) End effector 400 may be mounted on a robot arm or machine tool for example. Tool 412, which may be a drill bit, mill, or any other attachment, goes on end effector 410.

Also, for example, probe 500 comprises probe body 510, shaft 520, tip 530, and one or more targets 200A. (Target 200B or any other collection of three or more points could equally well have been used.) By analyzing the image of the points of light on targets 200A, the 6-DOF tracker calculates the coordinates of probe tip 530. Probe tip 530 may be inserted inside holes or behind objects that are not visible to the camera in 6-DOF tracker 1000. Probe 500 may take any shape. The probe may be tilted in any direction or bent into any shape. Probe body 510 may be any length.

Also another embodiment of a target, for example, tooling-hole fiducials 600 sit inside tooling holes (not shown) that have been drilled in a tool or work piece to serve as fiducial (reference) points. The purpose of tooling-hole fiducials is to enable determination of the coordinates of the tooling hole. This information may be used to establish the frame of reference of the measuring instrument in terms of the global coordinates of the tool or work piece. This information may also be used to check for changes in the work piece caused by thermal expansion or similar effects.

Tooling-hole fiducial 610 comprises shank 612, body 614, and vertical target 200A. Shank 612 sits inside the tooling hole. Tooling-hole fiducial 620 comprises shank 622, body 624, and horizontal target 200A. Tooling-hole fiducial 630 comprises hemisphere 632, nest 640, and target 200C. Target 200C is like target 200A except that the pedestals are located beneath the outermost points in target 200C rather than the innermost as in target 200A. On the bottom of nest 640 is a shank (not shown) that sits inside a tooling hole. The center point of light of target 200 is located at the spherical center of hemisphere 632 so that its coordinates do not change as hemisphere 632 is rotated. In this embodiment for example, the purpose of having three different types of tooling-hole fiducials is to provide an appropriate viewing angle for 6-DOF tracker 1000. However, any number of tooling-hole fiducials may be used depending upon the application.

Spherical target 700 comprises spherical body 712 and points of light 714 and central point of light 716. Central point of light 716 is located at the spherical center of spherical body 712. As spherical body 712 is rotated, central point of light 716 remains fixed. Spherical target 700 may be moved over any object as a way of determining the coordinates of points of an entire surface or multiple surfaces. Because the distance from the spherical center and the surface being touched by target 700 is a known constant value, the coordinates of the surface being measured can be determined. From the collected data, characteristics of the object such as flatness, perpendicularity, diameter, and so forth can be found. Alternatively, a nest 800 can be attached to the surface at various points. The nest provides a convenient alternative to tooling holes for establishing fiducial locations. Spherical target 700 has four light sources 714 along the upper surface of spherical body 712. Two light sources 714, in addition to light source 716, are sufficient to determine the angles and distance to the center of sphere 716. The additional two points of light 714 (four rather than two) have been added to improve accuracy. Additionally, two sources of light 714 and one source of light 716 are sufficient to provide the pitch, roll, and yaw angles of spherical target 700. However, because point of light 716 is located in the center of a spherical surface, pitch, roll, and yaw angles are not ordinarily required to make measurements with spherical target 700.

Figures 4, 4A, 4B:
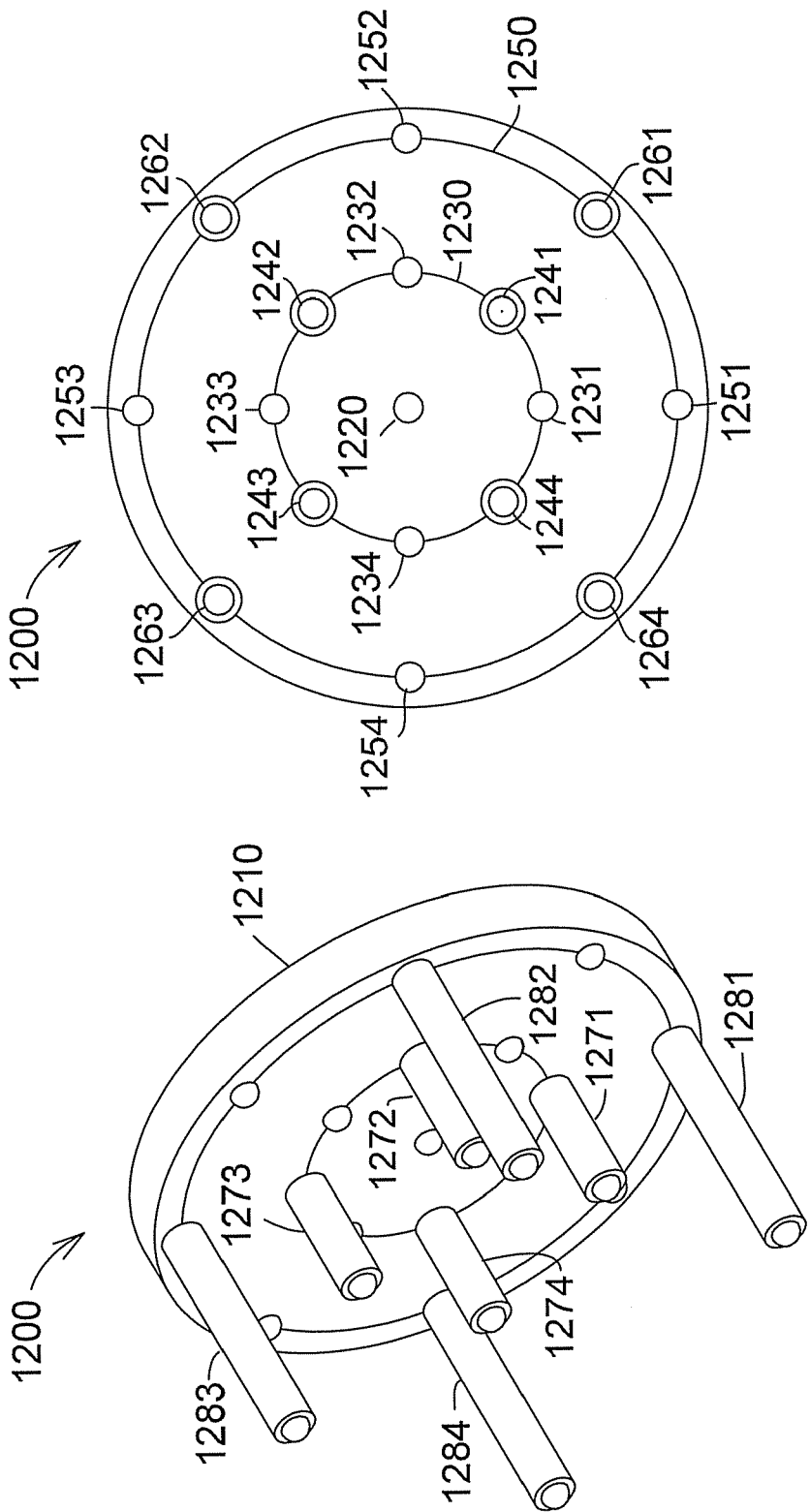
FIGS. 4A and 4B are perspective and front views of exemplary target 1200.

Referring to FIG. 4, target 1200 comprises mount 1210; pedestals 1271-1274, 1281-1284; and point sources of light 1220-1234, 1241-1244, 1251-1254, 1261-1264. Mount 1210 and pedestals 1271-1274, 1281-1284 are preferably made of a material having a low thermal coefficient of expansion such as Invar. Point sources of light 1220-1234, 1241-1244, 1251-1254, and 1261-1264 are preferably light-emitting diodes that are not covered by glass, epoxy, or similar material, unobstructed by bonding wires, and having a wide angle of emission. Alternatively, point sources of light 1220-1234, 1241-1244, 1251-1254, and 1261-1264 may be photogrammetric targets illuminated by an external source of light. Point sources of light are located either along circle 1230 or 1250. When target 1200 is relatively far from tracking camera 100, point sources of light 1251-1254, 1261-1264 along the outer circle 1250 and point source of light 1220 are illuminated. When target 1200 is too close to 6-DOF tracker 1000 for all LEDs along outer circle 1250 to be simultaneously viewed by the photosensitive array within 6-DOF tracker 1000, then point sources of light 1231-1234, 1241-1244 along inner circle are illuminated. The additional point sources of light in target 1200 compared to targets 200A, 200B, and 200C, enable better accuracy in measurements made by the tracking camera. Target 1200 has eight point sources of light along circle 1230 and eight points of light along circle 1250. This compares to only two equivalent points in targets 200A, 200B, and 200C. This factor-of-four increase in the number of point sources of light causes accuracy to increase by a factor of approximately the square root of four. In other words, the accuracy of target 1200 is expected to be approximately two times better than that of targets 200A, 200B, and 200C. To increase the range of high accuracy measurement of tracking camera with target 1200, additional circles of LEDs may be placed inside circle 1230 or outside circle 1250.

Figure 5:
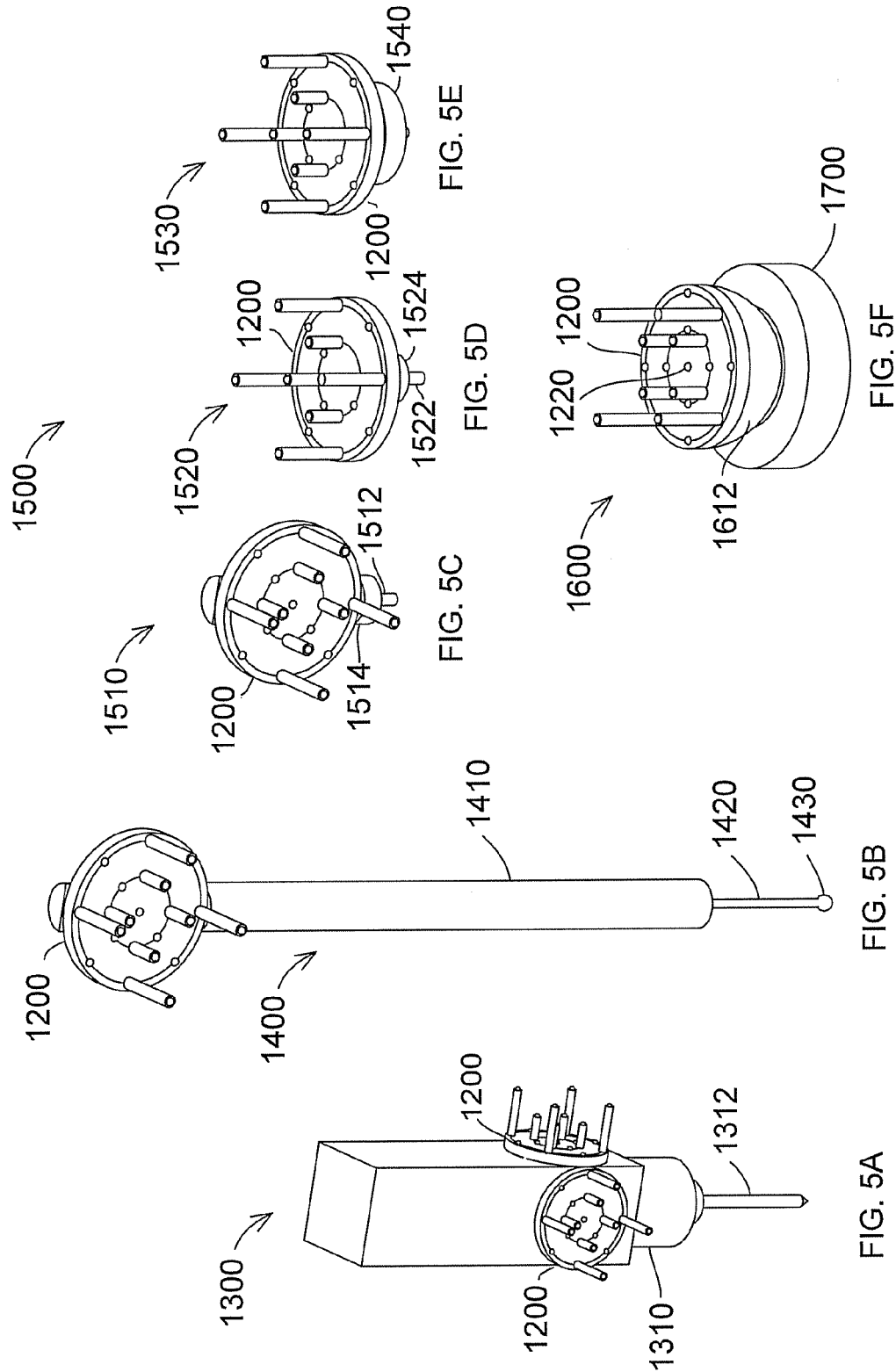
FIGS. 5A-5F are perspective views of exemplary targets 1200.

In reference to FIG. 5, other embodiments of target 1200 are shown. For example, targeted end effector 1300 comprises end effector 1310 and target 1200. End effector may be mounted on a robot arm or machine tool for example. Tool 1312, which may be a drill bit, mill, or any other attachment, goes on end effector 1310.

Also, for example, probe 1400 comprises probe body 1410, shaft 1420, tip 1430, and target 1200. By analyzing the image of the points of light on target 1200, the 6-DOF tracker 1000 calculates the coordinates of probe tip 1430. Probe tip 1430 may be inserted inside holes or behind objects that are not visible to the camera in a 6-DOF tracker 1000. Probe 1400 may take any shape. The probe may be tilted in any direction or bent into any shape. Probe body 1410 may be any length. The length will be a known dimension.

Also another embodiment of a target, for example, tooling-hole fiducials 1500 sit inside tooling holes (not shown) that have been drilled in a tool or work piece to serve as fiducial (reference) points. The purpose of tooling-hole fiducials is to enable determination of the coordinates of the tooling hole. This information may be used to establish a frame of reference of the measuring instrument in terms of the global coordinates of the tool or work piece. This information may also be used to check for changes in the work piece caused by thermal expansion or similar effects.

Tooling-hole fiducial 1510 comprises shank 1512, body 1514, and vertical target 1200. Shank 1512 sits inside the tooling hole. Tooling-hole fiducial 1520 comprises shank 1522, body 1524, and horizontal target 1200. Tooling-hole fiducial 1530 comprises hemisphere 1532 (hidden from view in FIG. 5E but having the same shape as hemisphere 632 in FIG. 3E), nest 1540, and target 1200. On the bottom of nest 1540 is a shank (not shown) that sits inside a tooling hole. The center point of light of target 1200 is located at the spherical center of hemisphere 1532 so that its coordinates do not change as hemisphere 1532 is rotated. The purpose of having three different types of tooling-hole fiducials 1500 is to provide an appropriate viewing angle for 6-DOF tracker 1000.

Spherical target 1600 comprises spherical body 1612 and target 1200. The point of light 1220 centered in target 1200 is located at the spherical center of spherical body 1612. As spherical body 1612 is rotated, point of light 1220 remains fixed. Spherical target 1600 may be moved over any object as a way of determining the coordinates of points of an entire surface or multiple surfaces. Because the distance from the spherical center and the surface being touched by target 1600 is a known constant value, the coordinates of the surface being measured can be determined. From the collected data, characteristics of the object such as flatness, perpendicularity, diameter, and so forth can be found. Alternatively, a nest 1700 can be attached to the surface at various points. The nest provides a convenient alternative to tooling holes for establishing fiducial locations.

Figure 6:
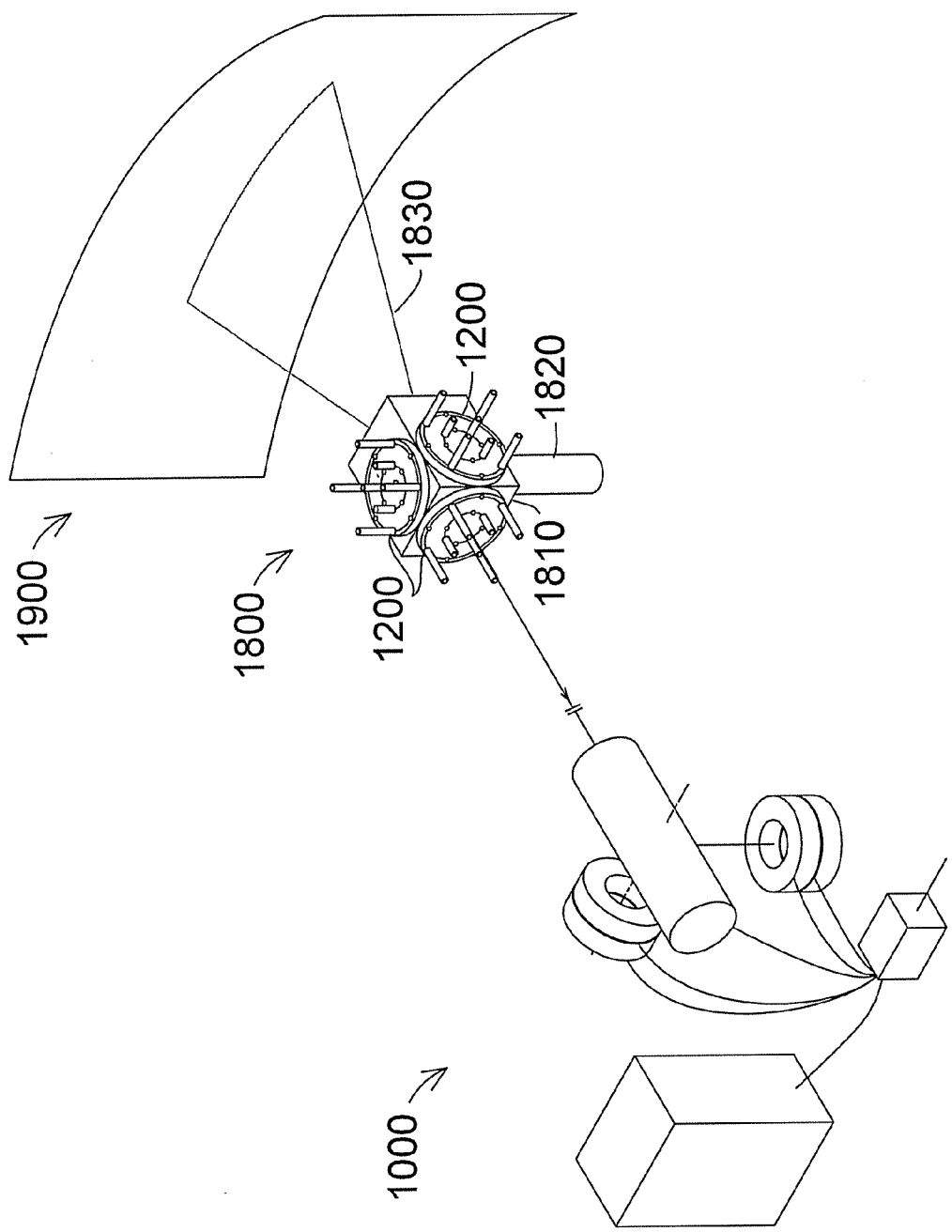
FIG. 6 is a perspective view of an exemplary referenced hand-held scanner 1800.

FIG. 6 shows another embodiment of target 1200. Referenced scanner 1800 comprises target(s) 1200 located on one or more faces of hand scanner body 1810 that is attached to hand scanner grip 1820. An operator holds hand scanner grip 1920 while pointing reference scanner 1800 at object-under-inspection 1900. Referenced scanner 1800 generates laser-line 1830 that strikes object-under-inspection 1900, thereby scattering light that is picked up by electro-optic detecting components (not shown) within referenced scanner. From this detected light, referenced scanner determines the three-dimensional contour of object-under-inspection 1900 relative to its own internal frame of reference. At the same time, 6-DOF tracker 1000 measures the six degrees of freedom of referenced scanner 1800 and uses this information to transform the scanned data into the global frame of reference. In this way, the operator can move referenced scanner 1800 to any location within the range of rotation of 6-DOF tracker 1000. The result is a contour of the entire object-under-inspection 1900 within the global frame-of-reference.

An alternative to mounting targets 1200 (or other targets such as 200A, 200B, or 200C) onto hand scanner body 1810 is to build the mounts for the point sources of light directly into hand scanner body 1810. For example, hand scanner body can be molded of carbon fiber composite, thereby achieving a stable mount with a very low coefficient of thermal expansion (CTE) for relatively low cost. This method also permits reinforcement that protects the protruding point sources of light.

Although specific locations are given in targets 1200, 200A, 200B, and 200C for the point sources of light, it should be understood that there are many suitable ways of arranging the point sources of light on the surface of hand scanner body 1810 and that the arrangements described here are not to be construed as limiting to the design.

A variant of the hand scanner shown in FIG. 6 is a scanner like that shown in FIG. 6 but mounted on a robotic structure (that is not held by hand). The robotic structure may be one that has many degrees of freedom, and in this case the scanner is mounted on the robot end effector. Alternatively, the scanner may be mounted on a robotic structure that moves rectilinearly. This rectilinear structure may be a simple motorized rail that moves in one dimension or a gantry structure that moves in two or three dimensions. Whether the movement of the robotic structure has numerous degrees of freedom or is constrained to rectilinear movement, points of light are mounted on the robotic structure in such a way as to permit inspection data collected by the scanner to be transformed into the global frame of reference. FIG. 6 shows an exemplary method of mounting the points of light onto the scanner that is attached to a robotic structure. In this case, however, grip 1820 would be removed and targets 1200 would be attached directly to the robotic structure.

Figure 7:
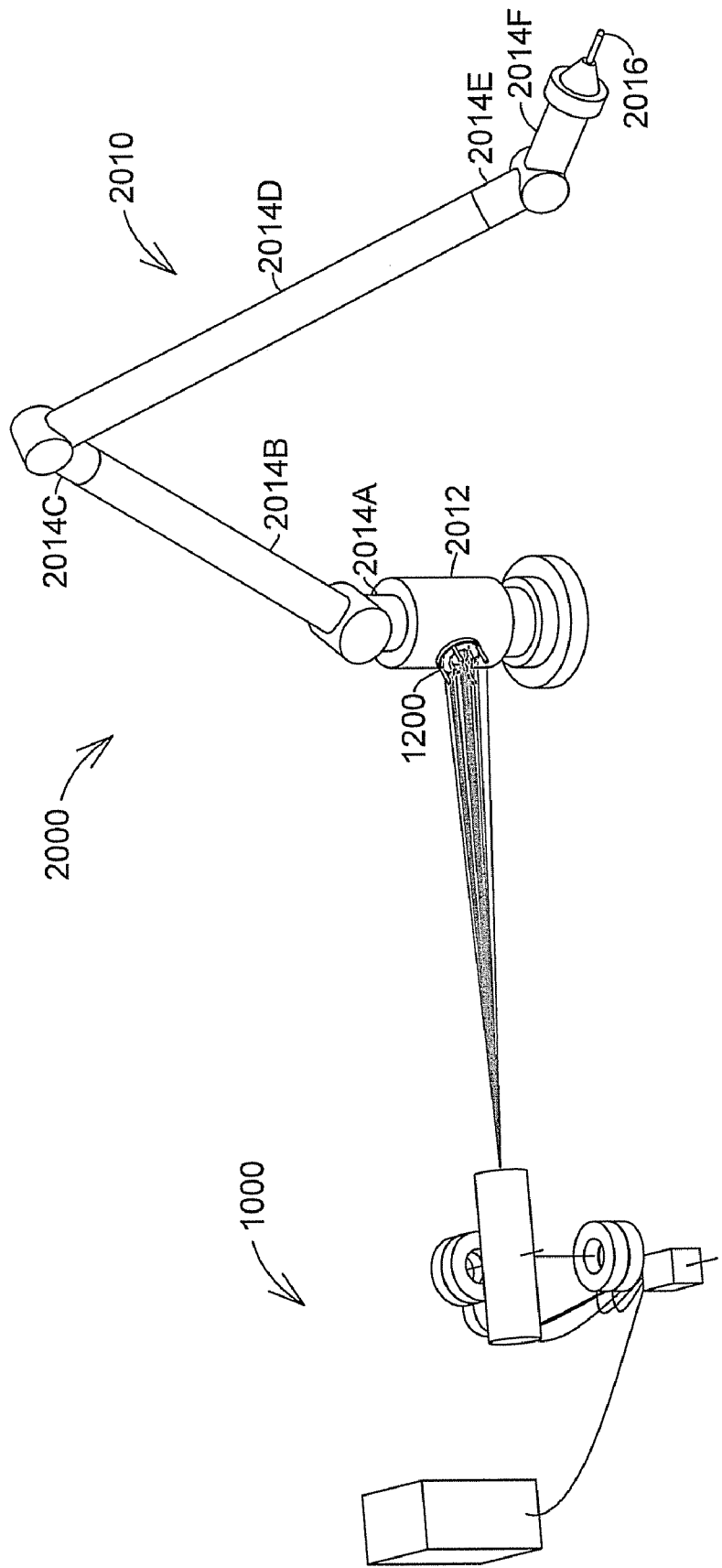
FIG. 7 is a perspective view of an exemplary referenced articulated arm CMM 2000.

FIG. 7 shows another embodiment of target 1200. Referenced articulated-arm coordinate measuring machine (CMM) 2000 comprises articulated-arm CMM 2010 and target 1200. Articulated-arm CMM 2010 comprises stationary base 2012, a plurality of rotatable segments 2014A-2014F, probe tip 2016, and angular encoders 2018 (internal components that are not visible in FIG. 7). The operator brings probe tip 2016 into contact with the object-under-inspection (not shown). Angular encoders 2018 are located at each joint. They measure the angles of rotatable segments 2014A-2014F, and these angles are used to calculate the position of probe tip 2016 to high accuracy. Each articulated-arm CMM 2010 has a certain maximum reach that is determined by the combined length of the individual rotatable segments. To measure large objects-under-inspection, it is necessary to move articulated-arm CMM 2010 to multiple locations. Traditional methods for doing this such as measuring multiple target nests in a piggyback fashion can be time consuming and inconvenient. This problem is eliminated when 6-DOF tracker 1000 images light emitted by target 1200 in referenced articulated-arm CMM 2000. Six-DOF tracker 1000 immediately determines the six degrees-of-freedom of referenced articulated-arm CMM and converts the 3D coordinates measured by referenced articulated-arm CMM into the global frame-of-reference.

Figure 8:
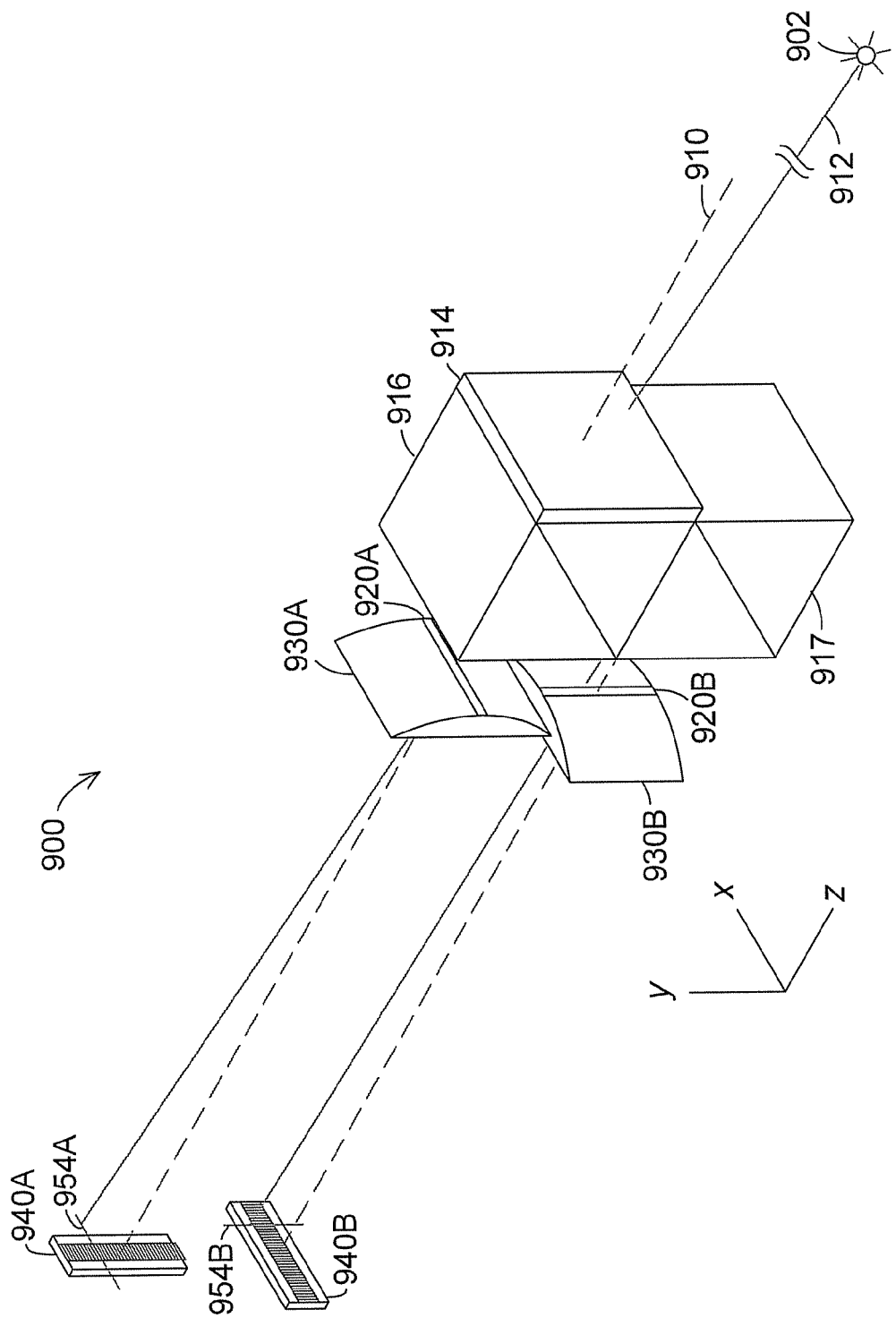
FIG. 8 is a perspective view of the internals of one possible embodiment of camera 140 with cylindrical lenses.

Referring to FIG. 8, the internals of a possible embodiment of camera 140 of FIG. 1 are described. Camera internals 900 may comprise filter 914, beam splitter 916, right-angle reflector 917, apertures 920A, 920B, cylindrical lenses 930A, 930B, and photosensitive arrays 940A, 940B. Light emerges from point 902. This may correspond to any light found on targets—for example, 210, 211, or 212. Filter 914 removes unwanted wavelengths of light to improve signal-to-noise ratio. Some light from source 902 travels through filter 914, beamsplitter 916, aperture 920A, and cylindrical lens 930A to form line of light 954A on photosensitive array 940A. Another part of the light travels through filter 914, is reflected by beamsplitter 916, reflected a second time by right-angle reflector 917, passes through aperture 920B and cylindrical lens 930B to form line of light 954B on photosensitive array 940B. Cylindrical lens 930A, 930B may comprise multiple lens elements. Apertures 920A, 920B may be on either side or within the lens elements of cylindrical lens 930A and 930B.

The position of the line of light on photosensitive array 940A indicates the ratio of the y coordinate of the point of light to the z coordinate of the point of light. Similarly the position of the line of light on photosensitive array 940B indicates the ratio of the x coordinate of the point of light to the z coordinate of the point of light.

Figure 9:
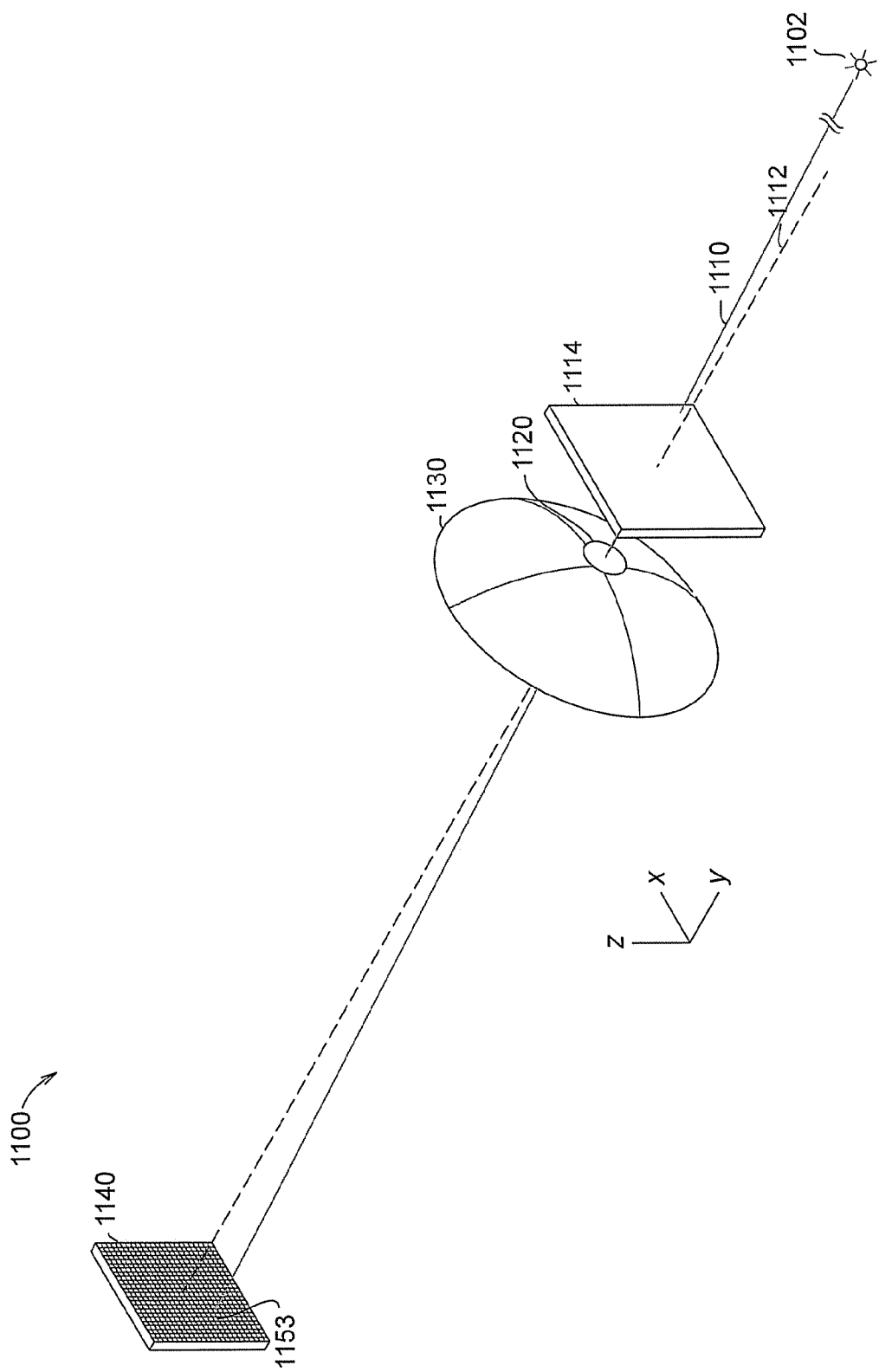
FIG. 9 is a perspective view of the internals of another possible embodiment of camera 140 with a spherical lens.

In reference to FIG. 9, the internals of another possible embodiment of camera 140 of FIG. 1 are described. It shows an imaging block within the cameras wherein the images are formed with spherical optics and an area photosensitive array.

Camera 1100 is an embodiment of camera 140. Camera 1100 comprises filter 1114, aperture 1120, lens 1130, and photosensitive array 1140. Source of light 1102 can be any light on a target—for example, points of light 210, 211, or 212. Light passes through aperture 1120, lens 1130 and comes to a small spot at point 1153 on photosensitive array 1140. In most cases, there will be at least three image spots on photosensitive array 1140 from a corresponding number of light sources. Lens 1130 may comprise multiple lens elements. Aperture 1120 may be on either side or within the lens elements of lens 1130.

Figure 10:
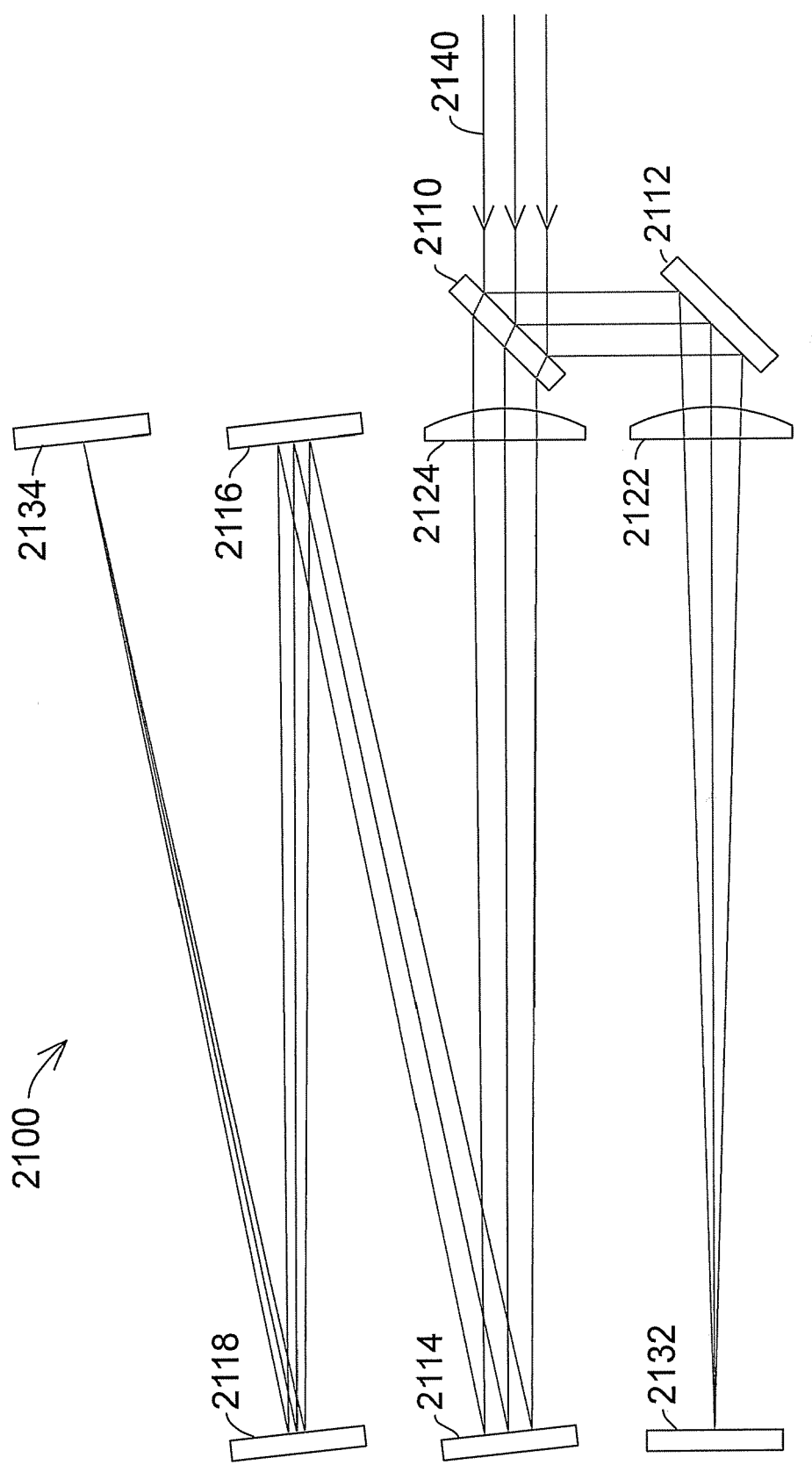
FIG. 10 is a schematic representation of another possible embodiment of camera 140 with spherical lens and two beam paths.

Camera 2100 is another embodiment of camera 140. Camera 2100 comprises beam splitter 2110, mirrors 2112, 2114, 2116, 2118 spherical lenses 2122, 2124, and photosensitive arrays 2132, 2134. Light 2140 from a point source strikes beam splitter 2110. Part of the light is reflected by the beam splitter 2110, further reflected by mirror 2112, and imaged by spherical lens 2122 onto photosensitive array 2132. Another part of the light is transmitted through beam splitter 2110, focused by spherical lens 2124, reflected off mirrors 2114, 2116, 2118 and strikes photosensitive array 2134. For the specific layout shown in FIG. 10, the focal length of lens 2124 is approximately four times as large as the focal length of lens 2122.

The advantage of camera 2100 is that it permits the camera to retain high accuracy over a wide range of distances while retaining a reasonably small target size. For example, suppose that the focal length of lens 2122 is 150 mm and the focal length of lens 2124 is 600 mm. Also suppose that the photosensitive array has 1000 pixels, each 5 micrometers in length and width. If the target is 50 mm in diameter, then the image fills the photosensitive array from edge to edge when the distance from the target to the camera origin for lens 2122 is 1.5 meters. To see this, note that the distance is found by taking the target diameter times the focal length divided by the width of the photosensitive array; in other words, (50 mm)(150 mm)/(5 mm)=1.5 meters. Since the pixels must fill anywhere from 50 to 100 percent of the edge-to-edge distance, it follows that the point sources of light located on the periphery of a 50-mm target can cover the range from 1.5 to 3 meters. If target 1200 is used, then the two concentric circles of lights permits the camera to be used over the extended range of 0.75 to 3 meters. Since lens 2124 has four times the focal length of lens 2122, it follows that its acceptable range of distances are increased by a factor of four, which means camera 2100 can cover the range from 0.75 to 12 meters with a two-inch target. By adding to target 1200 an additional circle of lights having a diameter of 100 mm, the range can be extended to 24 meters. Cameras that can measure to such large distances need point sources of light that emit more optical power than cameras that measure to nearer distances.

Camera Positioning Mode

As discussed previously, the tracker has three modes of positioning the camera: tracking mode, user-specified positioning mode, and manual positioning mode. When tracking mode is turned on, the gimbal mechanism causes the camera to rotate about two axes to follow the movement of the target. The tracking mechanism attempts to keep a pre-defined light source, usually a central light source such as 211 or 243, approximately centered on the photosensitive array. It is not essential that the central light source be exactly centered on the photosensitive array. It is just important that the target be centered well enough to keep the important points of light on the photosensitive array.

The method used by the tracker to keep the central light source on the target approximately centered in the camera is as follows. Camera 140 sends the centroid positions of the spots of light on the photosensitive array to processor 150. Processor 150 calculates the number of pixels from the centroid of the central spot of light to the effective center of the photosensitive array. The effective center is defined as that position where the optical axis intersects the photosensitive array. Processor 150 uses this number of pixels, along with the angles reported by angle meters 122 and 132 to calculate by what angles first-angle shaft (not shown) and second-angle shaft (not shown) need to be rotated to move the central spot into the effective center of the photosensitive array.

The advantage of the tracking mode is that a user can move a target from point to point. The tracker will automatically follow the target without the user having to walk back to 6-DOF tracker 1000 or computer 300 to get the camera pointed in the proper direction. This is particularly useful when the operator is moving a target such as probe 500, fiducial target 600, or spherical target 700 from point to point as a way of measuring the characteristics of the part or fixture under observation. When tracking mode is active, a large amount of data is rapidly collected and then automatically analyzed to determine characteristics such as surface contour, hole or feature position, hole, sphere, or cylinder diameter, surface flatness, perpendicularly between adjacent surfaces, departure of surfaces from CAD specifications, and so forth.

A second mode is user-specified positioning mode. In this mode, the user specifies the approximate coordinates of the target or, alternatively, the direction in which the camera is to be pointed. In most cases, the "user" is actually computer 300, which has been programmed to measure at predetermined coordinates. One example of a useful application for user-specified positioning mode is to move the camera appropriately to accurately measure the position of a robot end effector. The end effector has been approximately placed in the predetermined position by the robot itself, which makes it easy for computer 300 to drive the camera. Another example of a useful application for user-positioning mode is to measure a number of fiducial targets (600) or repeatability targets (not shown). Repeatability targets are similar to fiducial targets except that repeatability targets are typically glued to surfaces rather than placed in holes or nests. Fiducial targets are often measured to quickly establish a frame of reference for the fixture or part under test. Both fiducial and repeatability targets are often used to verify thermal and mechanical stability of a tool, fixture, or part.

A third mode is manual positioning mode. In this mode, motors 124 and 134 are turned off and the user physically points the camera in the desired direction. With the camera pointed in approximately the right direction, the motors are turned on. If the target is within view of the camera, motors 124 and 134 quickly center the target in the camera. If the target points of light are out of view, a search procedure is carried out in which motors 124 and 134 move the camera in a pattern such as a spiral until the points of light are found. Manual positioning mode is often convenient when tracking has been lost and the nominal coordinates of the target are not known.

In applications such as robotic control, the orientation of target 400 for example is known ahead of time. In other cases, such as measurement of arbitrary surfaces with the target held in the hand of the user, the position of the target such as target 500, 600, 700, or 1200 may not be known ahead of time, and there may be a 180-degree ambiguity in the orientation of the target. In this case, it is convenient to flash one or more designated light sources to remove the 180-degree ambiguity. For example, light sources 211 and 212 could be flashed at the start of a measurement while light source 210 was left off. This removes the 180-degree ambiguity and establishes the identity of the light sources on the target.

Mathematical Method

This is the mathematical method for the case of the rotating camera.

Suppose that there are three points of light 210, 211, and 212 on a target 200A and another point such as the tip of tool 412, whose position we would like to know, which is fixed relative to the target. This point may be the tip of a drill bit attached to a robot arm or the tip of a handheld probe. The point may also be the center of a spherical target, the center of a hole beneath a fiducial target, or a variety of other locations.

Let the rotating camera 140 frame of reference have as its origin the intersection of the optical axis 1112 and the entrance pupil of the camera lens 1130 for example when using the spherical lens 1130 camera shown in FIG. 5. The entrance pupil is defined as apparent aperture-stop as viewed from the front of the lens 1130. If aperture 1120 is in front of lens 1130, then the entrance pupil will coincide with aperture 1120. From the equations of paraxial (small angle) optics, all rays appear to converge to the entrance pupil. In reality, this is not quite true, and we must make a correction to account for the departure from paraxial conditions. This is explained below.

Let the coordinates of the three points of light (210, 211, 212) on the target 200A relative to the rotating (camera) frame of reference be $(X_1, Y_1, Z_1)$, $(X_2, Y_2, Z_2)$, and $(X_3, Y_3, Z_3)$. Let the distance between the pairs of points be $L_{12}$, $L_{23}$, and $L_{13}$.

We calculate the centroids of the three spots of light on the photosensitive array of the camera. Next, we apply a compensation correction value that is a function of the field angle and distance to the point of light relative to the camera origin.

This correction value is determined at the factory by taking a number of measurements. Generally for symmetric lenses, the correction values can be efficiently described as polynomial expansions in odd powers of the field angle.

After this correction has been made, the resulting coordinates of the three spots of light (210, 211, 212) on the photosensitive array 1140 are given in the rotating (camera) frame of reference by $(x_1, y_1)$, $(x_2, y_2)$, and $(x_3, y_3)$. There are now 9 unknown coordinate values $\{X_i, Y_i, Z_i\}$, i=1, 2, 3. These can be solved with 9 equations.

If f is the effective focal length of the lens and if the optical axis intersects the photosensitive array at $(x_0, y_0)$, then the 9 equations are:

$$x_i - x_0 = -fX_i/Z_i, \; i=1,2,3 \tag{1}$$

$$y_i - y_0 = -fY_i/Z_i, \; i=1,2,3 \tag{2}$$

$$(X_i - X_j)^2 + (Y_i - Y_j)^2 + (Z_i + Z_j)^2 = L_{ij}, \; i<j \tag{3}$$

These nine equations can be solved with standard methods in linear algebra. If multiple measurements are made of the three points, then standard mathematical methods can be used to find the values for the coordinates of the points of light that give the least squared residual error. The method of minimizing the least squared residual error will also be used if a target contains more than three points of light.

To convert from the rotating-camera frame of reference to the fixed-tracker frame of reference, we use a transformation matrix. To make the method clear, consider the specific case in which first axis 126 is the zenith (y) axis and second axis 136 is the azimuth (z) axis. The zenith and azimuth axes coincide at a common point, called the gimbal point. The optical axis of the camera passes approximately through the gimbal point. To transform from the rotating-camera frame of reference to the fixed-tracker frame of reference, a rotation matrix is derived by performing Euler angle rotations in this order: z-axis, y-axis, and x-axis. Let the angles of rotation about the z-axis, (rotated) y-axis, and (rotated) x-axis be rz, ry, and rx, respectively. The angles ry and rz are determined by the readings of the angle meters 122 and 132. The angle rz is a constant value determined by the orientation of the photosensitive array relative to the other two axes. Let the center of the lens entrance pupil be the origin of the rotating camera and let the gimbal point be the origin of the fixed tracker. The coordinates of the tracker origin relative to the camera origin are then (tx, ty, tz). This is approximately equal to (tx, ty, tz)~(0, 0, d), where d is the distance from the camera entrance pupil to the tracker gimbal point. We signify the cosine and sine of the three rotation angles by placing a capital C or S, respectively, in front of a subscript indicating the particular rotation angle. The transformation matrix is $$T = \begin{pmatrix} C_{ry}C_{rz} & C_{ry}S_{rz} & -S_{ry} & tx \\ S_{rx}S_{ry}C_{rz} - C_{rx}S_{rz} & C_{rx}C_{rz} + S_{rx}S_{ry}S_{rz} & S_{rx}C_{ry} & ty \\ C_{rx}S_{ry}C_{rz} + S_{rx}S_{rz} & -S_{rx}C_{rz} + C_{rx}S_{ry}S_{rz} & C_{rx}C_{ry} & tz \\ 0 & 0 & 0 & 1 \end{pmatrix}. \tag{4}$$

Let the coordinates in the fixed-tracker frame of reference be $(X_{1T}, Y_{1T}, Z_{1T})$, $(X_{2T}, Y_{2T}, Z_{2T})$, and $(X_{3T}, Y_{3T}, Z_{3T})$. Define the matrices $V_T$ and V as $$V_T = \begin{pmatrix} X_{1T} & X_{2T} & X_{3T} \\ Y_{1T} & Y_{2T} & Y_{3T} \\ Z_{1T} & Z_{2T} & Z_{3T} \\ 1 & 1 & 1 \end{pmatrix} \tag{5}$$

-continued $$V = \begin{pmatrix} X_1 & X_2 & X_3 \\ Y_1 & Y_2 & Y_3 \\ Z_1 & Z_2 & Z_3 \\ 1 & 1 & 1 \end{pmatrix} \tag{6}$$

The coordinates of the three target points of light in the fixed-tracker frame of reference are then found with this equation:

$$V_T = TV \tag{7}$$

Following this calculation, the three-dimensional coordinates of the three or more points of light on the target are known. As mentioned in the opening paragraph of this section, the usual objective is to find the position of another point, such as a probe tip or a drill bit, that is rigidly affixed to the target. To find the position of this point in the tracker frame of reference, it is necessary to know the position of this point relative to the other points of light on the target. A way to do this is to establish a target frame of reference by letting points of light 210 and 212 represent the y axis and point of light 211 through pedestal 220 represent the z axis. If the point to be determined corresponds to a probe tip such as tip 530, then factory procedures are performed ahead of time to find the coordinates in the target frame of reference. To find the coordinates of probe tip 530 in the fixed-tracker frame of reference, it is necessary to determine a transformation matrix similar to the one in Equation (4). This transformation matrix is found from the coordinates of the three or more points of light on the target, relative to the fixed-tracker frame of reference, using traditional methods of linear algebra. Because these methods are well known, they are not be discussed further. For the case in which the point to be determined is the tip of a tool 412, then the coordinates of the tool tip cannot be determined at the factory but must be determined by an on-site procedure. One possible on-site procedure is to move the tool tip to a particular position and then measure that position using probe 500 or similar means. Alternatively, the tool may be used to perform an action, such as drilling a hole and then measuring the characteristics (position and depth) of that hole using probe 500 or similar means. The same linear algebra methods, which are well known to those skilled in the art, are used to determine the transformation matrix for this case.

System Accuracy

Overview

In the past, getting high accuracy in both radial and angular measurements with camera-based metrology systems has meant using two or more cameras spaced relatively far apart. By narrowing the field of view and ensuring that the target nearly fills the photosensitive array, we get around the accuracy problem using a single camera. This is made possible by using a gimbaled beam-steering mechanism together with angle meters such as high accuracy angular encoders. Furthermore, the gimbal/encoder arrangement can measure over a much wider range of angles than traditional multi-camera systems while also being able to see into narrow openings that are inaccessible to multi-camera systems.

In the past, getting high accuracy in both radial and angular measurements with camera-based metrology systems has meant using two or more cameras spaced relatively far apart. When using a single camera, high accuracy can be achieved by narrowing the field of view and ensuring that the target nearly or substantially fills the photosensitive array. This is made possible by using a gimbaled beam-steering mechanism together with angle meters such as high accuracy angular encoders. Furthermore, the gimbal/encoder arrangement can measure over a much wider range of angles than traditional multi-camera systems while also being able to see into narrow openings that are inaccessible to multi-camera systems.

A question that might arise is what is meant by terms such as "a narrow field or view" and "nearly filling the photosensitive array," which have been used here. In the examples below, it is assumed that a photosensitive array is 5 mm on a side and has 1000×1000 pixels. If the distance from the lens to the photosensitive array of camera 140 is 100 mm, then the angular field of view is 5 mm/100 mm=0.05 radian, which is approximately 3 degrees. If the target is 50 mm in length, then the pixels will completely cover the photosensitive array along a linear dimension such as side-to-side or up-to-down when the target is 1 meter from the camera. As indicated in the discussion below, the radial accuracy in this case is approximately 5 ppm and the angular accuracy, which is dominated by the accuracy of the angular encoders, is approximately 10 ppm. If this same target is moved 2 meters from the camera, the radial accuracy will drop to 10 ppm, and the angular accuracy will remain nearly unchanged at approximately 10 ppm. If this same target is moved farther away from the same tracker, then the relative uncertainty in the radial measurement will increase while the relative uncertainty in the angular measurement will still be approximately 10 ppm. To get around this increase in the relative uncertainty of radial measurements, targets like 200B can be used. With this type of target, additional light sources are visible as distance from tracker to target is increased, thereby restoring the radial accuracy, as explained in detail elsewhere. For the case considered here, the target length would have to be increased from 50 mm to 100 mm to maintain an accuracy of 10 ppm out to 4 meters and to 200 mm to maintain an accuracy of 10 ppm to 8 meters. A way to preserve high accuracy while using small targets is to increase the distance from the lens to the photosensitive array in the camera. For example, by increasing the distance from the lens to the photosensitive array from 100 mm to 400 mm, an accuracy of 10 ppm can be achieved to 8 meters using a target that is only 50 mm in length. In this case, the field of view is reduced to 5 mm/400 mm=0.0125 radian, which is approximately 0.7 degree.

Radial Distance Accuracy

A question that might arise is what is meant by terms such as "a narrow field of view" and "nearly or substantially filling the photosensitive array," which have been used here. In the examples below, it is assumed that a photosensitive array is 5 mm on a side and has 1000.times.1000 pixels. If the distance from the lens to the photosensitive array of camera 140 is 100 mm, then the angular field of view is 5 mm/100 mm=0.05 radian, which is approximately 3 degrees. If the target is 50 mm in length, then the pixels will completely cover the photosensitive array along a linear dimension such as side-to-side or up-to-down when the target is 1 meter from the camera. As indicated in the discussion below, the radial accuracy in this case is approximately 5 ppm and the angular accuracy, which is dominated by the accuracy of the angular encoders, is approximately 10 ppm. If this same target is moved 2 meters from the camera, the radial accuracy will drop to 10 ppm, and the angular accuracy will remain nearly unchanged at approximately 10 ppm. If this same target is moved farther away from the same tracker, then the relative uncertainty in the radial measurement will increase while the relative uncertainty in the angular measurement will still be approximately 10 ppm. To get around this increase in the relative uncertainty of radial measurements, targets like 200B can be used. With this type of target, additional light sources are visible as distance from tracker to target is increased, thereby restoring the radial accuracy, as explained in detail elsewhere. For the case considered here, the target length would have to be increased from 50 mm to 100 mm to maintain an accuracy of 10 ppm out to 4 meters and to 200 mm to maintain an accuracy of 10 ppm to 8 meters. A way to preserve high accuracy while using small targets is to increase the distance from the lens to the photosensitive away in the camera. For example, by increasing the distance from the lens to the photosensitive array from 100 mm to 400 mm, an accuracy of 10 ppm can be achieved to 8 meters using a target that is only 50 mm in length. In this case, the field of view is reduced to 5 mm/400 mm=0.0125 radian, which is approximately 0.7 degree.

To obtain a large field-of-view with the narrow field-of-view camera, rotate the camera to any desired angle while simultaneously measuring the desired angle to high accuracy. Under these conditions, radial distance accuracy can be very good.

Let $N_T$ be the number of pixels along one dimension in photosensitive array 1140 for example and N be the maximum number of pixels between any two spots of light on the image of photosensitive array 1140. Let R be the average distance from the lens 1120 to the target points of light, and let $R_0$ be the distance from lens 1120 to the position at which the outermost image spots are at opposite edges of the array. The following formula holds:

$$R = R_0 N_T / N \quad (8)$$

Take the differential to find the uncertainty in the range measurement.

$$|dR| = \frac{R_0 N_T}{N^2} |dN| \quad (9)$$

$$= \frac{R^2}{N_T R_0} |dN|$$

The relative uncertainty over distance is $$\frac{|dR|}{R} = \frac{R}{N_T R_0} |dN| \quad (10)$$

Equation (10) indicates that the relative uncertainty is proportional to radial distance. This behavior is not found in most other measuring devices such as angular encoders, interferometers, or high performance absolute distance meters, which have relative error that is constant and independent of distance.

In a high quality camera system, the subpixel accuracy for a single point of light is one part in 100 or better. To determine a distance, two pixels are measured, and each contributes its own random noise. The resulting noise is then 1 part in 70.7. If target 1200 or similar is used, there are four times as many point sources of light (in addition to the central point of light). This causes a reduction in the uncertainty of approximately $\sqrt{4} = 2$. The effective uncertainty in pixel position is then $dN = 1/141$. If the target image subtends all 1000 pixels in a 1000 pixel CCD array when $R_0 = 1$ meter, then the total uncertainty in the radial distance measurement when the target is 1 meter from the lens is $$|dR| = \frac{R^2}{N_T R_0}|dN| \quad (11)$$

$$= \frac{(1\text{ m})^2}{1000 \cdot (1\text{ m})} \frac{1}{141}$$

$$= 7\,\mu\text{m}$$

The relative uncertainty is 7 μm/1 m=7 ppm. This result can also be obtained from Eq. (10). Now suppose that target 1200 achieved the above result by using points of light located along the inner circle 1230. If target 1200 is now moved to a distance 2 meters from 6-DOF tracker 1000, then the points of light along outer circle 1250 turn on, and the relative accuracy of 7 ppm is retained. If target 1200 is moved 4 meters from 6-DOF tracker 1000, then the accuracy will decrease to 14 ppm.

For the case in which measurements are being made at a stationary point, it is possible to improve accuracy by measuring the same point multiple times with the camera shifted slightly. This is called the "camera shift" technique. Since the pixel errors are random, the error in the measurement will decrease by a factor of the square root of the number of measurements, at least for a small number of measurements. For example, it is possible to move the tracker to four slightly different positions within a one or two second interval and measure the target with 6-DOF tracker 1000 in each case. For the example given above, the uncertainty of 14 ppm at 4 meters would be reduced by the $\sqrt{4}=2$ for an accuracy of 7 ppm.

Equation (10) above has been thoroughly tested using Monte Carlo simulation and found to hold under a wide range of conditions.

Orientation Accuracy

The target can be rotated into a variety of angles. These angles can be described as rotations about the three axes: $\theta_x$, $\theta_y$, and $\theta_z$. Sometimes the terms pitch, yaw, and roll are alternatively used to describe three orthogonal rotations. Here the z axis corresponds to the optical axis of the camera. The accuracy of these three angles affects mostly the accuracy of a point which is attached to the target—for example, the tip of a probe or tool.

To calculate the uncertainty in the orientation angles for a specific case, we consider target 200A having three points (210, 211, and 212) located at (0, 0, 0), (a, 0, b), and (−a, 0, b). In other words, when viewed from a camera positioned along the z-axis, the three points appear to form a straight line, with one point midway between the other two. Now suppose that the x-axis is rotated by an angle $\theta_x$ about the origin point (0, 0, 0). The other two points rotate to coordinates (a,−b sin $\theta_x$, b cos $\theta_x$) and (−a,−b sin $\theta_x$, b cos $\theta_x$). Compared to their original positions, these two points appear on the camera to have shifted in y by −b sin $\theta_x$. As an example, let the photosensitive array in the camera have a linear dimension L=5 mm, $N_T$=1000 pixels, and distance g=100 mm from the camera origin. Let the target be located at a distance h=1000 mm from the camera origin. Let the probe have a depth dimension b=25 mm. Assuming that the effective subpixel accuracy when using target 1200 is dN=1/141 as discussed above, the accuracy in determining the rotation of the target about the target's x-axis is approximately $$d\theta_x = \frac{hL}{gbN_T}dN \quad (12)$$

$$= \frac{(1000\text{ mm})(5\text{ mm})}{(100\text{ mm})(25\text{ mm})(1000)} \frac{1}{141}$$

$$= 14\,\mu\text{rad}$$

The uncertainty in the measurement of angle $\theta_x$ is approximately 14 microradians, which is the same as 14 parts per million (ppm).

Now consider the case in which the target is rotated about the y-axis by the angle $\theta_y$. For the same conditions described above, if the rotation is about the origin point, the other two points both appear to shift in the x direction by approximately b sin $\theta_y$. In other words, in the x-y plane of the camera, the origin point appears to move closer to one of the points than the other. For this case, the uncertainty in the measurement of the rotation angle $\theta_y$ is approximately the same as for rotation about $\theta_x$, or approximately 14 microradians.

For the case in which the target is rotated about the z-axis by the angle $\theta_z$, consider a specific example. If the target image subtends all 1000 pixels in a 1000 pixel CCD array when $R_0$=1 meter, then the uncertainty in the measurement of the angle $\theta_z$ when the target is 1 meter from the lens is $$d\theta_z = \frac{2R}{N_T R_0}dN \quad (13)$$

$$= \frac{2 \cdot (1\text{ m})}{1000 \cdot (1\text{ m})} \frac{1}{141},$$

$$= 14\,\mu\text{rad}$$

which is the same uncertainty as for the orientation angles in the x and y directions.

The uncertainty in the orientation (pitch, roll, and yaw) angles is multiplied by the distance from the origin of target to the point that is to be determined, which might be the tip of a probe or the tip of a tool such as a drill. For example, if a drill tip is located on an end effector 400 at a distance 200 mm below the center of target 200B, the uncertainty in the position of the drill tip in relation to the target is approximately 14 ppm multiplied by 0.2 meter, which is 2.8 micrometers.

Because of the small uncertainties in the rotation angles, it is possible to attach the target a long distance from the tip of a machine tool or a long distance from the tip of a probe without significantly degrading accuracy. For the sake of clarity, the uncertainty in the position of such a tip with respect to the target will be called "relative tip position" uncertainty.

Angular Accuracy

A convenient method for determining the x-y-z coordinates of a machine tool, probe tip, or fiducial marker is to determine the coordinates of the target point relative to an arbitrary origin point. A best-fit calculation is then carried out to determine the distance to the origin point and the three rotation angles $\theta_x$, $\theta_y$, and $\theta_z$. Finally, this information is used to calculate the position of the machine tool, probe tip, or fiducial marker.

To determine the angle of the origin point on the target, an angular correction is added to the angles indicated by angle meters 122 and 132, which are preferably angular encoders. This angular correction is based on the image pattern at the camera array. The uncertainty in this angular correction is $(\phi_{FOV}/N_T)dN$. Using a field of view of 0.05 radian (approximately 3 degrees), 1000 pixels, and an effective subpixel accuracy for target 1200 of $1/141$, the uncertainty in the correction value is 0.35 microradian, which is a very small uncertainty. The uncertainty in the angular measurement of a gimbal system includes uncertainty components from the angular encoders, bearings, kinematic compensation, and angular correction as described above. If the angular bearings are of high quality and the kinematic compensation is suitable, then with high quality angular encoders the total angular error of 5 to 10 microradians is possible. This is equivalent to saying that the accuracy of the angular encoder is 5 to 10 μm/m or 5 to 10 ppm. Under these conditions, the angular correction component of the angular uncertainty is negligible.

System Accuracy

The overall uncertainty in the coordinates of a point in a fixed position relative to the target is affected by (1) radial distance uncertainty, (2) angular distance uncertainty, (3) kinematic uncertainty, and (4) "relative tip position" uncertainty. Kinematic uncertainty refers to uncertainty associated with kinematic parameters such as R0 (distance from gimbal point to reference point on the instrument), Axis Offset (distance between mechanical axes at the point of closest approach), Axis Non-squareness (angle between the two mechanical axes with respect to 90 degrees), and so forth. With the properly designed target, good electrical, mechanical, and optical design, and good compensation, the uncertainty components are approximately (1) 7-14 ppm in radial distance, (2) 5-10 ppm in side-to-side (angular) distance, and (3) 1-2 ppm in kinematic effects. The uncertainty in the relative tip position is approximately 14 ppm, but this value is multiplied by the distance from the target to the probe tip rather than by the distance from the target to the tracker. For this reason, the uncertainty in the relative tip position is usually small and can be ignored. Radial and angular uncertainties are approximately equal, which will result in an uncertainty region in space that is approximately spherical and about 7-14 ppm in radius.

As a specific example of how this relative uncertainty is converted into an absolute uncertainty, consider the case in which a target is measured at 3 meters with a relative uncertainty of 10 ppm. The uncertainty in the position of the target is then 3 m·10 μm/m=30 μm, which is a little more than 0.001 inch. For control of a robot drilling machine, an uncertainty of 150-200 micrometers is considered adequate in most cases. The device described here therefore has the accuracy required for this application. Furthermore, the simplicity of the design makes a low-cost, metrology-grade instrument available for the first time.

What is claimed is:

1. A camera based target coordinate measuring system for use in measuring the position of objects without requiring use of a laser range finder for measuring distance comprising:

a camera rotatable about a first axis and a second axis;

a target having at least three or more light sources wherein the light sources are located on the target at known three-dimensional coordinates relative to each other and wherein at least one of the light sources is located at a different distance from the camera than the midpoint of a line segment connecting two of the other light sources, and wherein the target is structured to be placed on an object to be measured or to be placed on a device to measure the object;

two angular measuring devices structured to measure angles of rotation of the camera about the first and second axes;

at least one motor structured to rotate the camera about the first and second axes;

a photosensitive pixel array located in the camera structured to record an image of the light sources on the target; and a processor structured to direct the motor and structured to determine up to three positional degrees of freedom and up to three rotational degrees of freedom of the target based the image of the light sources on the target and the angles of rotation of the camera about the first and second axes without requiring use of a laser range finder for measuring distance;

wherein the target can be positioned at one of a plurality of distances from the camera;

the three or more light sources are positioned on the target such that images of the light sources substantially fill the photosensitive pixel array in at least one direction when the target is positioned at each of the plurality of distances; and the three or more light sources are illuminated or brought into view as needed to maintain accuracy as radial distance from the camera is increased.

2. A camera based target coordinate measuring method for use in measuring the position of objects without requiring use of a laser range finder for measuring distance comprising:

operating a camera rotatable about a first axis and a second axis;

placing a target to view with the camera, the target having at least three or more light sources wherein the light sources are located on the target at known three-dimensional coordinates relative to each other and wherein at least one of the light sources is located at a different distance from the camera than the midpoint of a line segment connecting two of the other light sources, and wherein the target is structured to be placed on an object to be measured or to be placed on a device to measure the object;

rotating the camera about the first and second axes to view the target;

measuring angles of rotation of the camera about the first and second axes;

recording an image of the light sources on a photosensitive pixel array located in the camera; and determining up to three positional degrees of freedom and up to three rotational degrees of freedom of the target based the image of the light sources on the target and the angles of rotation of the camera about the first and second axes without requiring use of a laser range finder for measuring distance;

wherein the target can be positioned at one of a plurality of distances from the camera;

the three or more light sources are positioned on the target such that images of the light sources substantially fill the photosensitive pixel array in at least one direction when the target is positioned at each of the plurality of distances; and the three or more light sources are illuminated or brought into view as needed to maintain accuracy as radial distance from the camera is increased.

3. A camera based coordinate measuring system for use in measuring the position of a target relative to at least one frame of reference without requiring use of a laser range finder for measuring distance comprising:

at least three or more light sources located on a target at known three-dimensional coordinates relative to each other;

at least one rotatable camera rotatable on about a first axis and a second axis wherein the camera is structured to record positions of the light sources with a photosensitive pixel array; and two angular measuring devices to measure the angles of rotation of the camera about the first and second axes; and a processor for determining up to three positional degrees of freedom and up to three rotational degrees of freedom of the target based the recorded positions of the light sources and the angles of rotation of the camera about the first and second axes without requiring use of a laser range finder for measuring distance;

wherein the target can be positioned at one of a plurality of distances from the camera;

the three or more light sources are positioned on the target such that images of the light sources substantially fill the photosensitive pixel array in at least one direction when the target is positioned at each of the plurality of distances; and the three or more light sources are illuminated or brought into view as needed to maintain accuracy as radial distance from the camera is increased.

4. The system of claim 3 wherein the light sources are point light sources.

5. The system of claim 3 wherein the light sources are light emitting diodes (LED's).

6. The system of claim 3 wherein the target is structured to be placed on an object to be measured or to be placed on a device to measure the object.

7. The system of claim 3 further comprising:
two motors to rotate the camera about the first and second axes.

8. The system of claim 3 wherein the light sources are located on the target at known three-dimensional coordinates relative to each other and wherein at least one of the light sources is located at a different distance from the camera than the midpoint of a line segment connecting two of the other light sources, and wherein the target is structured to be placed on an object to be measured or to be placed on a device to measure the object.

9. The system of claim 3 wherein the target is structured to be placed on a probe having a probe tip in order to measure the three dimensional coordinates of an object brought into contact with the probe tip.

10. The system of claim 3 wherein the target is a spherically shaped target.

11. The system of claim 3 wherein the target is structured to be placed on a laser scanner unit.

12. The system of claim 3 wherein the target is structured to be placed on a coordinate measurement machine (CMM).

13. The system of claim 3 wherein the target is structured to be placed on a robotic arm.

14. The system of claim 3 wherein the target is incorporated in a tooling hole fiducial in order to determine the three dimensional coordinates of a tooling hole in an object.

15. The system of claim 3 wherein the target is structured to be placed on an articulated-arm coordinate measuring machine (CMM).

16. The system of claim 1, wherein the camera has an angular field of view of approximately 6 degrees or less.

17. The method of claim 2, wherein the camera has an angular field of view of approximately 6 degrees or less.

18. The system of claim 3, wherein the camera has an angular field of view of approximately 6 degrees or less.

* * * * *